(12) United States Patent
Weintraub et al.

(10) Patent No.: US 11,645,424 B2
(45) Date of Patent: May 9, 2023

(54) INTEGRITY VERIFICATION IN CLOUD KEY-VALUE STORES

(71) Applicant: International Business Machines Corporation, Armonk, NY (US)

(72) Inventors: Grisha Weintraub, Givatayim (IL); Alon Kadosh, Moshav Shefer (IL)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 16/858,776

(22) Filed: Apr. 27, 2020

(65) Prior Publication Data

US 2021/0334409 A1    Oct. 28, 2021

(51) Int. Cl.
*G06F 21/64* (2013.01)
*G06F 16/23* (2019.01)
*H04L 9/32* (2006.01)

(52) U.S. Cl.
CPC .......... *G06F 21/64* (2013.01); *G06F 16/2365* (2019.01); *H04L 9/3236* (2013.01); *H04L 9/3247* (2013.01)

(58) Field of Classification Search
CPC ... G06F 21/64; G06F 16/2365; H04L 9/3236; H04L 9/3247
See application file for complete search history.

(56) References Cited

U.S. PATENT DOCUMENTS

| | | | | |
|---|---|---|---|---|
| 5,440,732 A | * | 8/1995 | Lomet | G06F 16/2246 |
| 7,870,398 B2 | * | 1/2011 | Perng | G06F 21/64 |
| | | | | 707/699 |
| 10,983,877 B1 | * | 4/2021 | Hoffman | G06F 11/3034 |
| 2003/0182291 A1 | * | 9/2003 | Kurupati | G06F 16/289 |

(Continued)

FOREIGN PATENT DOCUMENTS

| | | | | |
|---|---|---|---|---|
| CN | 104394155 B | | 11/2014 | |
| CN | 108108384 A | * | 6/2018 | G06F 16/22 |

(Continued)

OTHER PUBLICATIONS

Rady, Mai, et al. "Integrity and Confidentiality in Cloud Outsourced Data." Ain Shams Engineering Journal, Elsevier, Apr. 4, 2019. www.sciencedirect.com/science/article/pii/S2090447919300541.

(Continued)

*Primary Examiner* — Sher A Khan
(74) *Attorney, Agent, or Firm* — Brian D. Welle

(57) ABSTRACT

A computer-based system and method for verifying integrity of data in a key-value database, including assigning each key that is supported by the key-value database to a bucket in a keys database. Upon storing a pair of a value and a key in the key-value database, storing in the bucket assigned to the key a presence indicator indicative of a presence of the key in the key-value database. A bucket is assigned to a key by applying a predetermined function on the key. When reading a value from the key-value database, if the response is empty: getting from the keys database the bucket associated with the key and searching the bucket for the presence indicator associated with the key. If the presence indicator associated with the key is found in the bucket determining that the key-value database is not complete.

13 Claims, 7 Drawing Sheets

(56) References Cited

U.S. PATENT DOCUMENTS

| | | | |
|---|---|---|---|
| 2012/0005419 A1* | 1/2012 | Wu | G06F 16/25 |
| | | | 711/E12.078 |
| 2014/0344236 A1* | 11/2014 | Xiao | G06F 16/2358 |
| | | | 707/696 |
| 2014/0379450 A1* | 12/2014 | Barbieri | G06Q 30/0207 |
| | | | 705/14.25 |
| 2014/0379638 A1* | 12/2014 | Li | G06F 16/27 |
| | | | 707/610 |
| 2015/0341473 A1* | 11/2015 | Dumitrescu | H04L 45/7453 |
| | | | 370/392 |
| 2015/0365385 A1* | 12/2015 | Hore | H04L 63/0428 |
| | | | 713/152 |
| 2016/0048476 A1* | 2/2016 | Saeki | G06F 16/24552 |
| | | | 709/212 |
| 2016/0142883 A1* | 5/2016 | Zou | H04W 4/023 |
| | | | 455/456.1 |
| 2017/0068727 A1* | 3/2017 | Rubin | G06F 16/2255 |
| 2017/0070349 A1* | 3/2017 | Rubin | H04L 9/3247 |
| 2017/0147575 A1* | 5/2017 | Pappu | G06F 16/29 |
| 2017/0161522 A1* | 6/2017 | Anderson | G06F 21/64 |
| 2017/0308621 A1* | 10/2017 | Wu | G06F 16/24575 |
| 2018/0006820 A1* | 1/2018 | Arasu | G06F 21/645 |
| 2018/0011852 A1* | 1/2018 | Bennett | G06F 16/2228 |
| 2018/0217987 A1* | 8/2018 | Helland | G06F 16/24562 |
| 2018/0218023 A1* | 8/2018 | Fanghaenel | G06F 16/2343 |
| 2019/0213346 A1* | 7/2019 | Friedman | G06F 21/6218 |
| 2019/0236170 A1* | 8/2019 | Thonangi | G06F 16/2365 |
| 2019/0268308 A1* | 8/2019 | Sinha | H04L 9/3239 |
| 2019/0272254 A1* | 9/2019 | Srivas | G06F 16/278 |
| 2020/0034440 A1* | 1/2020 | Schneider | G06F 16/2255 |
| 2021/0142318 A1* | 5/2021 | Qian | H04L 9/085 |

FOREIGN PATENT DOCUMENTS

| | | | | |
|---|---|---|---|---|
| CN | 109583861 A | * | 4/2019 | G06F 21/64 |
| CN | 111221827 A | * | 6/2020 | |
| WO | WO-2015054877 A1 | * | 4/2015 | G06F 12/0864 |
| WO | WO 2017/016318 A1 | | 2/2017 | |

OTHER PUBLICATIONS

Arasu, Arvind, et al. "Concerto: A High Concurrency Key-Value Store with Integrity." SIGMOD'17, May 19, 2017. http//dx.doi.org/10.1145/3035918.3064030.

Sinha, Rohit et al. "VeritasDB: High Throughput Key-Value Store with Integrity Using SGX", IACR Cryptology EPrint, 2018. https://eprint.iacr.org/2018/251.pdf.

Yang, Ziqi et al. "Automated identification of sensitive data from implicit user specification." *Cybersecur* 1, 13, 2018. https:/doi.org/10.1186/s42400-018-0011-x.

Narasimha Maithili et al. "DSAC: integrity for outsourced databases with signature aggregation and chaining," In Proceedings of the 14th ACM internationai conference on Information and knowledge management (CIKM '05). Association for Computing Machinery, New York, NY, USA, 235-236. 2005. https://doi.org/10.1145/1099554.1099604.

Wang, Haixun et al. "Dual encryption for query integrity assurance." In Proceedings of the 17th ACM conference on Information and knowledge management (CIKM '08). Association for Computing Machinery, New York, NY, USA, 863-872. 2008. https://doi.org/10.1145/1458082.1458196.

Rivest, R.L. et al. "A method for obtaining digital signatures and public-key cryptosystems", Communications of the ACM, 21(2), 120-126. 1978.

Bloom, Burton H. "Space/time trade-offs in hash coding with allowable errors." Communications of the ACM, 13(7), 422-426. 1970.

Fagin, Ronald, et al. "Extendible hashing—a fast access method for dynamic files." ACM Transactions on Database Systems (TODS), 4(3), 315-344. 1979.

Litwin, Witold. "Linear hashing: a new tool for file and table addressing." In VLDB (vol. 80, pp. 1-3). 1980.

* cited by examiner

INTEGRITY VERIFICATION IN CLOUD KEY-VALUE STORES

FIELD OF THE INVENTION

The present invention relates generally to verifying integrity in key-value stores or databases.

BACKGROUND

The Database-as-a-Service (DBaaS) paradigm is a common approach for storing data in a cloud based computerized service, where users get access to data without the need for managing hardware or software. One type of DBaaS paradigm includes key-value databases, also referred as key-value stores. Key-value stores or databases may be or may include databases that store data as key-value pairs, such that the value is an arbitrary entry and the key is a unique identifier used for indexing and finding the value within the key-value database. Examples of key-value stores may include, among others, the Redis®, Riak®, and Amazon DynamoDB® services.

While providing advantages to data users, storing data in a cloud may introduce several security concerns. In particular, since cloud users do not physically possess their data, data integrity (e.g., data correctness and completeness) may be at risk. The cloud providers themselves or other malicious entities may change users' data, or omit some of the data from query results. Thus, data correctness and completeness may be compromised.

Therefore, a method for verifying data integrity in key-value stores is required.

SUMMARY

According to embodiments of the invention, a system and method for verifying data integrity in key-value stores may include: assigning, by a computer processor, each key that is supported by the computerized key-value database to one of a plurality of buckets in a computerized key database; and upon storing a pair of a value and an associated key in the computerized key-value database, storing by the computer processor in the bucket assigned to the associated key a presence indicator indicative of a presence of the associated key in the key-value database.

According to embodiments of the invention, assigning the bucket to a key may be performed by applying a predetermined function on the key, wherein the function includes a hash operation that is applied on the key, followed by a modulus operation, wherein the bucket key equals the result of the modulus operation.

According to embodiments of the invention, the presence indicator includes a copy of the key.

Embodiments of the invention may include signing the bucket with a digital signature.

According to embodiments of the invention, storing the presence indicator in the bucket may include applying a Bloom filter to the associated key and other keys that are stored in the bucket; and storing the result of the Bloom filter in the bucket.

Embodiments of the invention may include upon storing a pair of a value and an associated key in the computerized key-value database, signing the value using a digital signature.

According to embodiments of the invention, the computerized key-value database and the computerized key database are provided as a service in a cloud computing environment.

According to embodiments of the invention, a system and method for verifying data integrity in key-value stores may include: sending, by a computer processor, a request to retrieve a value from a key-value database, the request including the associated key; obtaining, by the computer processor, a response from the key-value database; if the response includes a value: verifying the correctness of the value using a digital signature of the value; and if the response does not include a value: obtaining, by the computer processor, from a keys database a bucket associated with the key; searching, by the computer processor, the bucket for a presence indicator associated with the key; and if the presence indicator associated with the key is not found in the bucket determining, by the computer processor, that the response is legitimate; and if the presence indicator associated with the key is found in the bucket determining, by the computer processor, that the key-value database is not complete.

According to embodiments of the invention, obtaining the bucket associated with the key from a keys database may include: sending a request to retrieve the bucket from the keys database, the request may include a bucket key, wherein the bucket key may be calculated by applying a predetermined function on the key, wherein the function may include a hash operation that is applied on the key, followed by a modulus operation, wherein the bucket key may equal the result of the modulus operation.

According to embodiments of the invention, the presence indicator may include a copy of the key, wherein searching the bucket for the presence indicator may include searching for the copy of the key.

According to embodiments of the invention, obtaining the response from the key-value database may include obtaining a digital signature of the bucket, embodiments of the invention may include verifying correctness of the bucket using the digital signature of the bucket.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
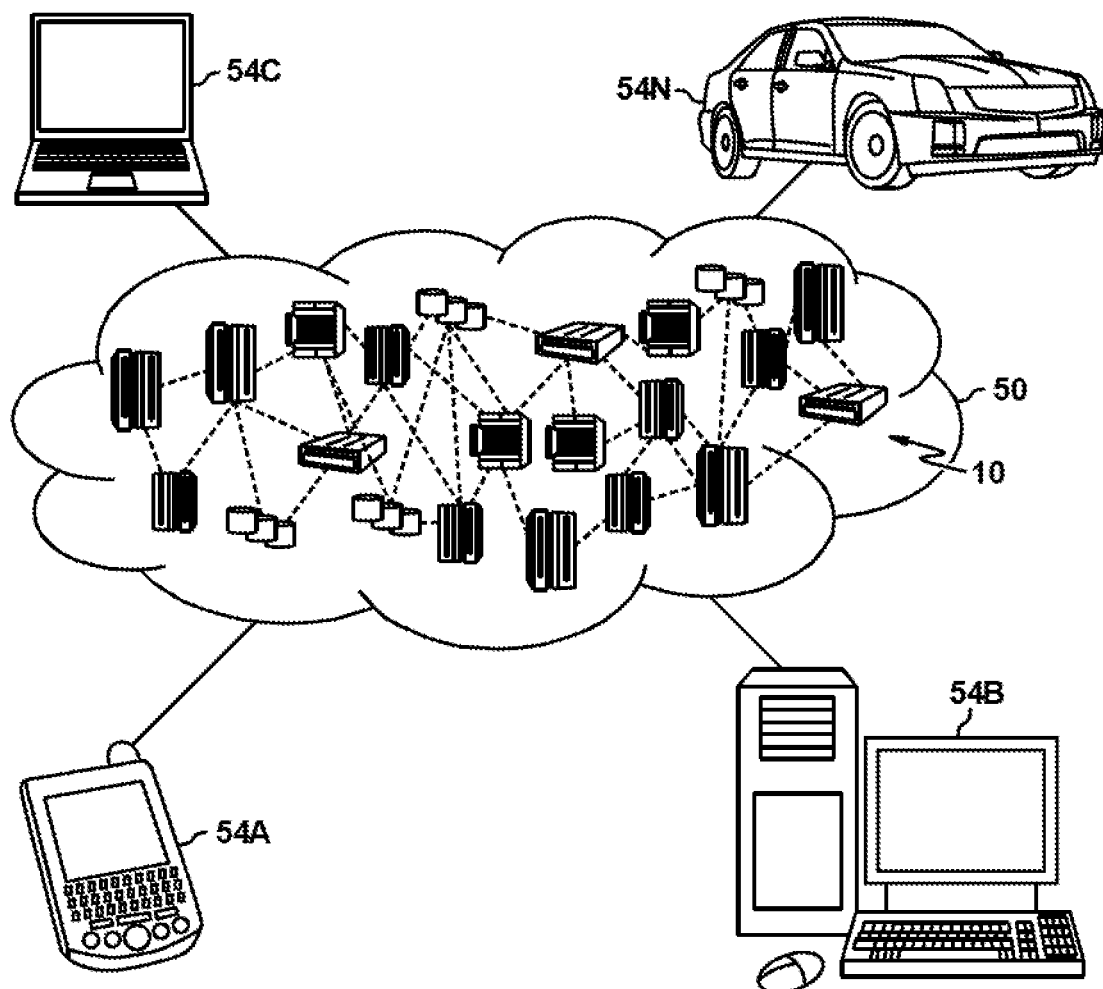
FIG. 1 depicts a cloud computing environment according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Example cloud model may include for example five characteristics, at least three service models, and at least four deployment models.

Characteristics may be for example:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be for example:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database-as-a-Service (DBaaS): the capability provided to the consumer is to store data on a cloud infrastructure. DBaaS paradigm is a common approach for storing data in a cloud based computerized service, where users get access to data without the need for managing hardware or software. One type of DBaaS paradigm includes key-value databases, also referred as key-value stores.

Deployment Models may be for example:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

There may three entities in the DBaaS model: a data owner (DO) that may upload the data to the cloud, a cloud provider (CP) that manage or control the underlying cloud infrastructure including networks, servers, operating systems, or storage, and may store and provide access to the data, and clients that retrieve the data from the cloud. In some embodiments, the data owner and the client may pertain to the same entity or organization.

Other cloud computing database services may be used with embodiments of the present invention.

A client may retrieve a value from the key-value database by sending a query for example, a "get(k)" query, where k is the key associated with the required value. For any client query of type "get(k)" and the corresponding CP result R, it is required that:

1. Correctness—R is correct, meaning that a pair (k, R) was previously uploaded to the cloud by the DO to be stored in the key-value database.
2. Completeness—R is complete, meaning that if R is empty, there was not any pair (k, X) that was previously uploaded to the cloud by the DO.

As known in the art, the correctness requirement may be easily verified using, for example, a digital signature scheme, e.g. RSA (Rivest-Shamir-Adleman). According to the RSA scheme, the DO may store a message (e.g., the value, the content of a bucket, etc.), together with a digital signature generated using a private key of the DO. The data client may retrieve the message and the digital signature, may decrypt the signature using the public key of the DO, and verify the decrypted signature against the message. If the signature is verified, the data client may be certain that the retrieved message is the correct, unaltered value, and that the message was stored in the cloud by the DO and not by someone else posing as the DO.

The completeness problem, however, is more complex. One method for trying to verify completeness in databases is tuples chaining. To implement tuples chaining, the DO may sign consecutive pairs of records together. Thus, on reads, clients may read two consecutive records and verify the signature against the two records. However, this method may not be applicable for key-value stores since there is no known or predetermined order between tuples in key-value stores. In addition, key-value stores usually support only simple get and put operations that retrieve a value that is associated with a single key. The fact that key-value stores support only get and put operations, means that from the data client perspective there is no defined order between the tuples. For example, to support the tuple chaining solution, the data client would want to be able to send queries of type "get a tuple with the highest key that is lower than my key". However, such queries are not supported in existing key-value stores. Therefore, tuple chaining can be either applied to a custom database or a modified version of existing databases, but not to the real-world key-value stores.

Another method for trying to verify completeness in databases is dual encryption. To implement dual encryption, the DO may encrypt each value twice, each time using a different encryption key, before uploading the value to the cloud. As a result, each key-value pair is stored in the cloud as two different pairs, so that if one the pairs is maliciously removed, the data client may obtain the other pair. The two main drawbacks of dual encryption are that the whole database must be encrypted, and that the required storage space is significantly increased.

According to some embodiments of the invention, keys inserted by the DO to the cloud database may be stored in a second database, a keys database, also referred to herein as KeysDB. Thus, for verifying completeness, when the data client receives an empty result from the CP, the client may check if the corresponding key exists in KeysDB, and if the corresponding key exists, a completeness problem or an integrity attack is detected.

According to some embodiments, the data client may have a trusted data source that may store and manage the KeysDB. In some embodiments, the KeysDB may be stored and managed by the DO. However, if the DO manages the KeysDB, many of the benefits of the DBaaS model are lost since the DO has to store and manage a database. According to some embodiments, the KeysDB may be stored and managed by the CP. However, if the KeysDB is stored in the cloud (typically remote and physically separate from the DO), there is no guarantee that the CP would not modify the key-value database together with the KeysDB. Thus, a completeness problem may still exist.

Embodiments of the invention may provide a system and method for managing (and typically thus physically controlling) a KeysDB by the same entity that manages the key-value database, e.g., the CP, while still enabling verification of data completeness by the data client. According to embodiments of the invention, the keys database may be divided into M buckets, also referred to as sections, and each possible key in the key-value database may be assigned (e.g., designated to or intended to be stored in) to one bucket (e.g. database bucket or section) in the KeysDB. The set of keys in each bucket may be signed by the DO, e.g. with an RSA scheme. On each update, e.g., on each deletion or insertion of a key-value pair to the key-value database, the DO may also update the relevant bucket (e.g., using a put command) and sign the updated set of keys. When data clients receive an empty result for their query, they also get (e.g., using a get command) the content of the relevant bucket. The data client may check if the corresponding key exists in the key set. If a data client receives an empty result for a query, and the corresponding key exists in the key set, the client may know that the data in the key-value database is not complete and an attack may be detected.

The value of M may range from 1 (one, meaning no division) to practically any required integer, and may be selected in accordance with the size of the key-value database. For example, M may be selected to ensure reasonable size get commands for reading the buckets. Selecting a low value of M for a large key-value database may result in a poor performance as the data client may need to read all the keys in a large bucket on each get query.

Embodiments of the invention may overcome the limitations of the existing solutions. Unlike tuples chaining, using embodiments of the present invention there may be no need to modify the cloud database and any key-value store may be used for the KeysDB management. Unlike dual encryption, using embodiments of the present invention there may be no requirement to encrypt the data and much less additional storage is required. Therefore, embodiments of the invention may improve the technology of key-value databases by providing a method for detecting completeness problems in key-value databases, with a minor computational and storage overhead.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. Cloud computing environment is typically located remotely from its users and thus remotely from computer systems controlled by a DO or data client; but other embodiments need not use such separation. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

According to embodiments of the invention, the cloud consumers may include the DO and the data client. For example, a DO may store data in cloud computing environment 50 and a data client may retrieve data from cloud computing environment 50 using any of personal digital assistant (PDA) or cellular telephone 54A, desktop computer 54B, laptop computer 54C, automobile computer system 54N and/or any other type of computerized device.

Figure 2:
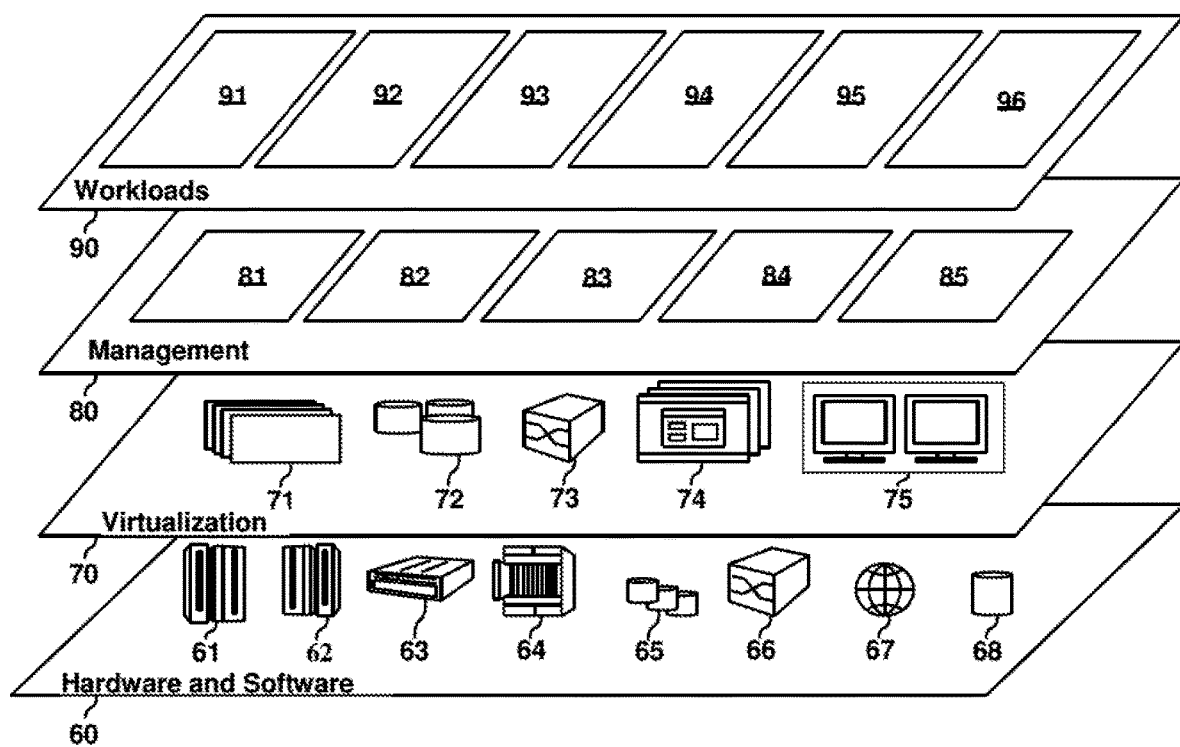
FIG. 2 depicts abstraction model layers according to an embodiment of the present invention.
Figure 6:
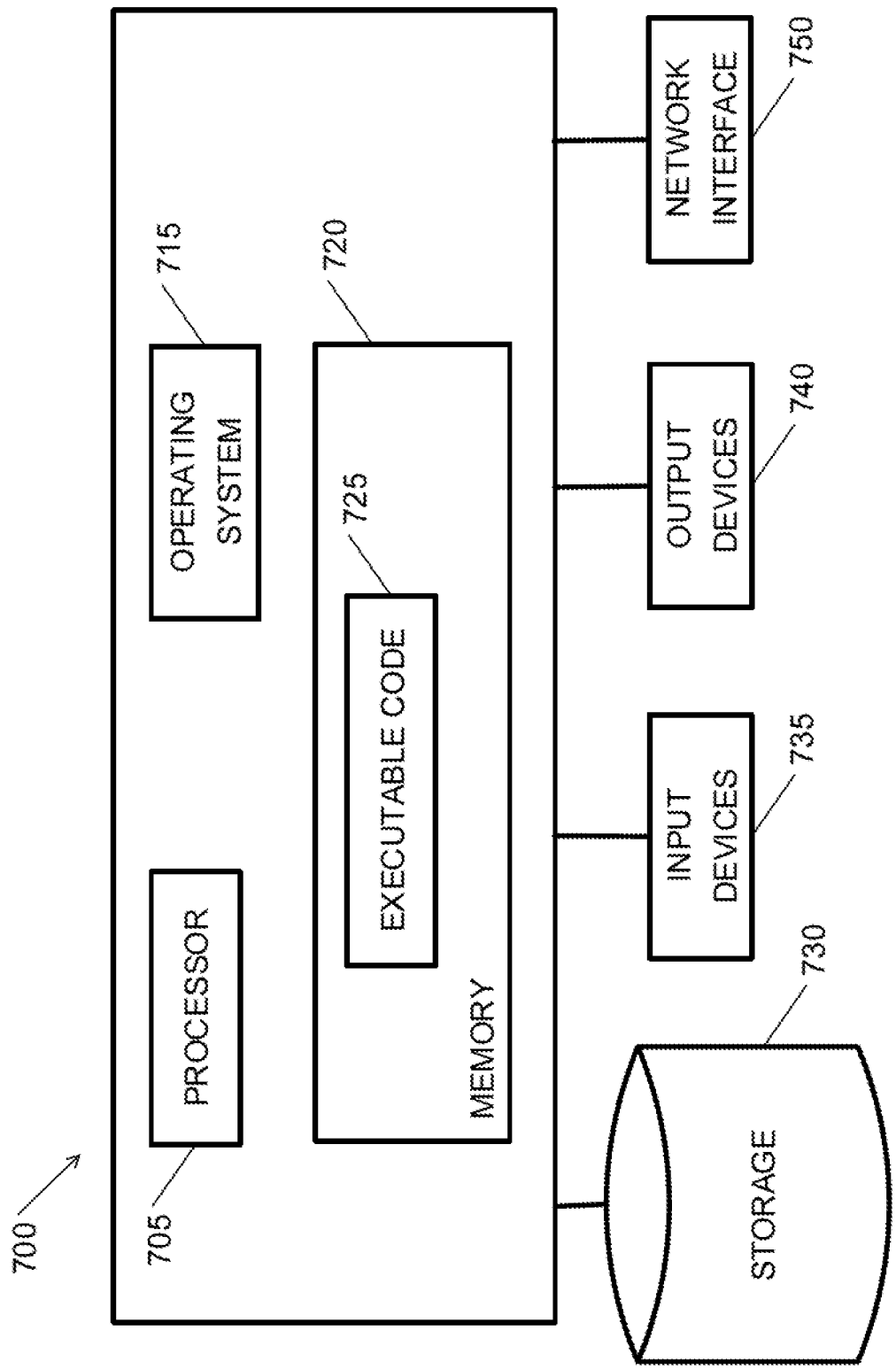
FIG. 6 illustrates an example computing device according to an embodiment of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components, such as the hardware and software components depicted in FIG. 6. Examples of hardware components include: processors (e.g., processor 705 depicted in FIG. 6) such as mainframes 61, RISC (Reduced Instruction Set Computer) architecture based servers 62, servers 63 and blade servers 64; storage devices 65 (e.g., storage device 730 depicted in FIG. 6); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

According to some embodiments, both the key-value database and the KeysDB may be implemented on virtual storage 72 and physically located on storage devices 65. Both the key-value database and the KeysDB may be managed by database software 68. However, other architecture and hardware may be used.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3A:
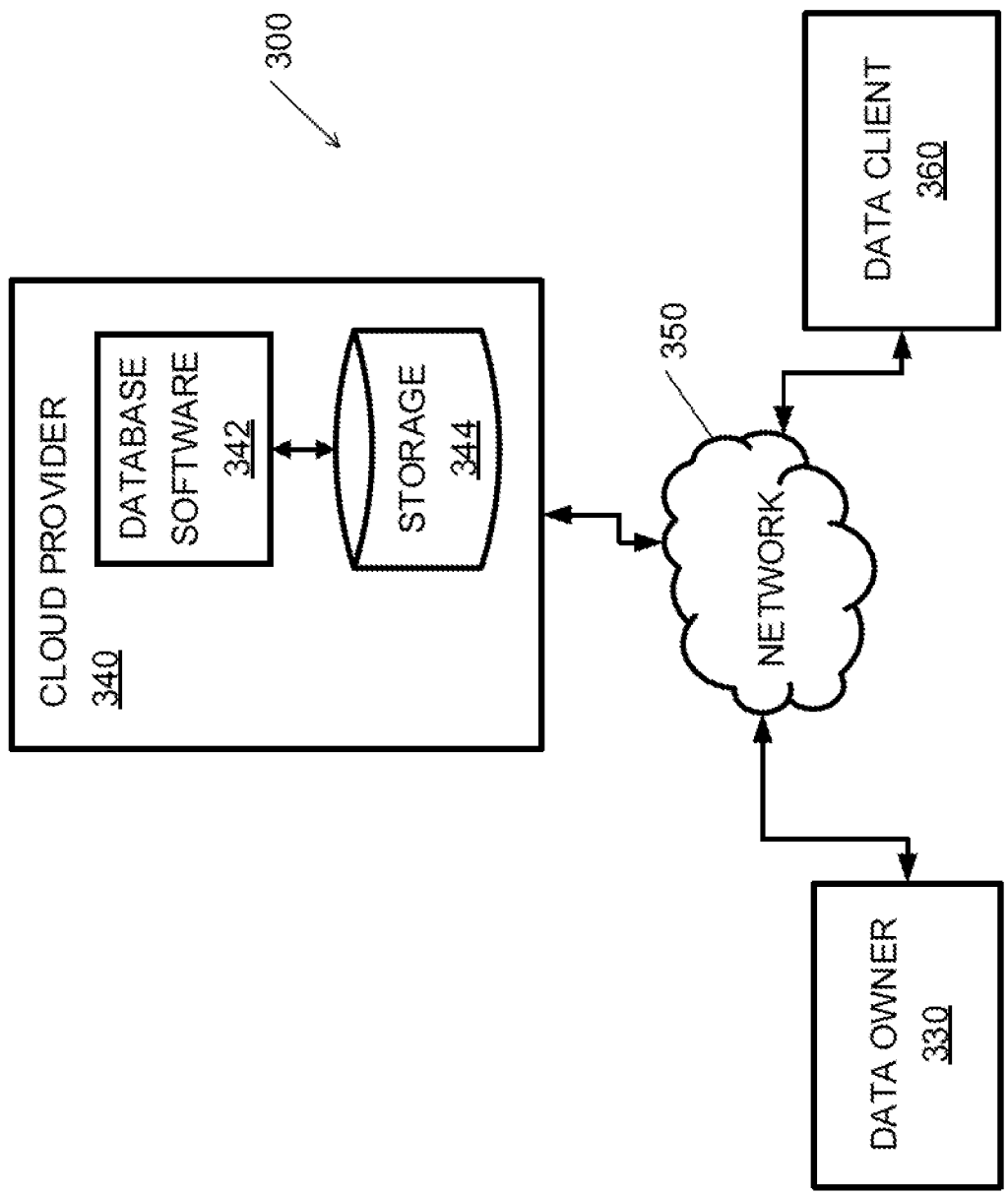
FIG. 3A depicts a system, according to embodiment of the invention.

Reference is made to FIG. 3A, depicting a system 300, according to embodiment of the invention. According to some embodiments, storage 344 and database software 342 may be implemented in cloud computing environment 50. Thus, storage 344 may be implemented on virtual storage 72, and database software 342 may be or may be included in database software 68, however, other implementations may apply. It should be understood in advance that the components, and functions shown in FIG. 3A are intended to be illustrative only and embodiments of the invention are not limited thereto.

Networks 350 may include any type of network or combination of networks available for supporting communication between DO 330, CP 340 and data client 360. Networks 340 may include for example, a wired, wireless, fiber optic, or any other type of connection, a local area network (LAN), a wide area network (WAN), the Internet and intranet networks, etc. Additionally or alternatively, any of database client 310 data source machine 320 and security server 330 may be connected to each other directly.

DO 330 may upload data to storage 344 as disclosed herein. CP 340 may manage or control the underlying cloud infrastructure including networks, servers, operating systems, or storage, and may store and provide access to the data. CP 340 may include storage 344 and database software 342. Both will be described in greater detail with reference to FIG. 3B. Data client 360 may retrieve the data from storage 344. In some embodiments, DO 330 and data client 360 may pertain to the same entity or organization. In some embodiments, DO 330 and data client 360 may pertain to different entities or organizations.

Figure 3B:
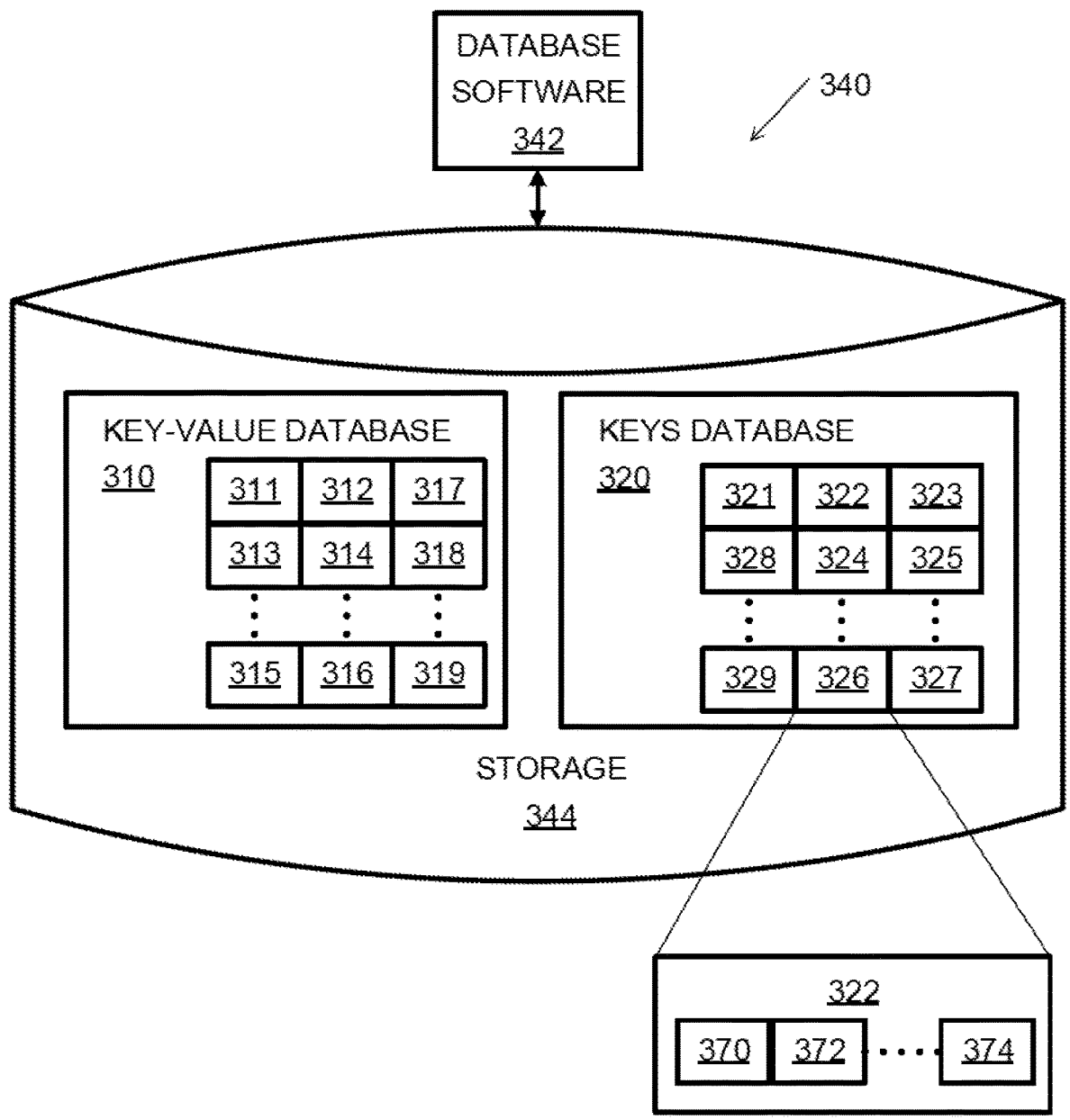
FIG. 3B depicts a key-value database and a keys database, according to embodiment of the invention.

Reference is made to FIG. 3B, depicting a key-value database 310 and a keys database 320, according to embodiment of the invention. While key-value database 310 and a keys database 320 may be implemented on virtual storage 72 (FIG. 2). Other implementations may apply. For example, key-value database 310 and a keys database 320 may be implemented on storage devices 65 (FIG. 2) and/or storage device 730 (FIG. 6). It should be understood in advance that the components, and functions shown in FIG. 3B are intended to be illustrative only and embodiments of the invention are not limited thereto.

Key-value store or key-value database 310 may be or may include a database that stores data as key-value pairs 311-312, 313-314, 315-316, such that each value 312, 314, 316 is an arbitrary entry and the associated key 311, 313, 315, respectively, is a unique identifier used to index and find the value 312, 314, 316 within key-value database 310. Each of values 312, 314, 316 may be a data item, a record, a simple object or a compound object.

Keys database or KeysDB 320 may store all the keys 311, 313, 315 used in key-value database 310, or a presence indicator 370, 372, 374 for all the keys 311, 313, 315 used in key-value database 310. KeysDB 320 may be divided into M buckets 322, 324, 326. According to some embodiments, if a maximal number of expected keys in DB is K, and maximal number of keys in a bucket 322, 324, 326 is B, then M=K/B (or if the result of the division is not an integer then M equals the quotient of K/B plus one).

According to some embodiments, keysDB 320 may be implemented as a key-value database, where the buckets are the values and the keys, referred to herein as bucket keys 321, 328, 329 are the bucket numbers. Other implementations may be used. M may be selected based on the number of keys 311, 313, 315 in key-value database 310 and the preferred or required bucket size. As the bucket size increases, each read or write to the bucket may require more resources and there may be an upper limit to a bucket size keysDB 320 (just as there may an upper limit to the size of values in a key-value database). As the bucket size decreases, more memory may be required for keysDB 320.

In some embodiments, the maximal number of keys in a bucket 322, 324, 326 may be determined or calculated by dividing the size of the value supported by keysDB 320 by the size of the bucket keys 321, 328, 329. In one example, a company may have one billion users, e.g., K=1,000,000,000, a user may have a unique identification number (ID) represented by 8-byte value. The user ID may be used as keys 311, 313, 315 in key-value database 310. Assuming that keysDB 320 supports value of size 128 KB (kilobyte), then the maximal number of keys of size 8-byte that may be stored in a single bucket equals the value size supported by keysDB 320 divided by the size of the bucket keys 321, 328, 329:

$$B=128,000/8=16,000,$$

M may equal the total number of keys 311, 313, 315 supported by key-value database 310 divided by the maximal number of keys 311, 313, 315 in a bucket 322, 324, 326:

$$M=K/B=1,000,000,000/16,000=62500.$$

Each of keys 311, 313, 315 or presence indicators 370, 372, 374 may be stored in one of sections or buckets 322, 324, 326. According to some embodiments, keys or presence indicators 370, 372, 374 may be divided among buckets 322, 324, 326 such that each key 311, 313, 315 or presence indicator 370, 372, 374 is assigned to one bucket 322, 324, 326. According to some embodiments, a bucket 322, 324, 326 is assigned or designated for each supported key 311, 313, 315, based on applying a predetermined function on the supported key 311, 313, 315. A key that is supported by key-value database 310 may be any value that is accepted and recognized as a key by key-value database 310. A key that is not supported by key-value database 310 may be a value that is not accepted and recognized as a key by key-value database 310. According to some embodiments, buckets 322, 324, 326 may be numbered from zero to M−1, where M is the number of buckets, and the function may include a hash operation that is applied on the key 311, 313, 315, followed by a modulus operation, where the bucket number equals the result of the modulus operation. Table I presents a list of buckets and associated keys. Other ways and functions may be used for assigning each key 311, 313, 315 to a bucket 322, 324, 326.

TABLE 1

| example list of buckets and associated keys. | |
|---|---|
| Bucket-0 | {key \| hash(key) mod M = 0} |
| Bucket-1 | {key \| hash(key) mod M = 1} |
| ... | ... |
| Bucket-M-1 | {key \| hash(key) mod M = M − 1} |

According to embodiments of the invention, when DO 330 (e.g. concurrently with, in response to, very shortly or immediately after, or triggered by) stores a key-value pair, e.g., pair of a value and an associated key, e.g., value 312 and associated key 311, in the computerized key-value database 310, DO 330 may store a presence indicator 370, 372, 374, e.g., a value, a sign, a character or a number indicative of a presence of the associated key 311 in key-value database 310, in the bucket assigned to the associated key 311 (e.g., bucket 322). According to embodiments of the invention, DO 330 may sign value 312 in key-value database 310 using digital signature 317, e.g., with RSA scheme. According to embodiments of the invention, DO 330 may sign the presence indicator, or all the presence indicators 370, 372, 374 in bucket 322 in keys database 320 using a digital signature 323, e.g., with RSA scheme. According to some embodiments, the DO may upload the key-value pair 311-312, and the presence indicator 370 (or the entire bucket 322 including the presence indicator 370) and the relevant signatures 323 to the cloud, and database software 68 may handle storing the key-value pair 311-312 (and the value signature 317) in key-value database 310 and the presence indicator 370 (or the entire bucket 322 including the presence indicator 370) and the bucket signature 323 in keys database 320. Similarly, value 314 may be stored together with its signature 318 and value 316 may be stored together with its signature 319, bucket 324 may be stored together with its signature 325 and bucket 326 may be stored together with its signature 327.

According to embodiments of the invention, data client 360 may send or transmit a request or a query to provide or retrieve value 312 from key-value database 320 to CP 340. The request may include key 311 that is associated with the requested value, e.g., the request may include a "get(k)" query, where k is the key associated with the required value. The request may be obtained in key-value database 310 (e.g., at database software 342). Upon obtaining or receiving the request or query, database software 342 may search for key 311 in key-value database 310. If key 311 is found in key-value database 310, database software 342 may provide (e.g., to data client 360) the required value 312 (and optionally signature 317 of required value 312) corresponding to the key 311.

If, however, key 311 is not found in key-value database 310, an empty result may be returned to data client 360. Returning to the completeness problem, an empty result may be a legitimate result in case there wasn't any pair (key 311, X) that was previously uploaded to key-value database 310 by the DO. However, if a pair (key 311, X) was previously uploaded to key-value database 310 by the DO, and deleted by another entity (e.g., a malicious entity) the empty result is not legitimate and may stem from a completeness problem that may be a result of an attack. Embodiments of the invention may provide a method for distinguishing between a legitimate empty result and a non-legitimate empty result. This may be achieved using the presence indicator 370. If, in case of an empty result, a presence indicator 370 in keys database 320 indicates that key 311 is present (e.g., should be present) in key-value database 310, e.g., that a pair (key 311, X) was previously uploaded to key-value database 310 by DO 330, then it may be determined that the empty result is not legitimate and constitutes a completeness problem. If, however, in case of an empty result, a presence indicator 370 in keys database 320 indicates that key 311 is not present (e.g., should not be present) in key-value database 310, e.g., that a pair (key 311, X) was not previously uploaded to key-value database 310 by DO 330, then it may be determined that the empty result is a legitimate result.

Thus, in case of an empty result, the data client 360 may determine whether key 311 should or should not be present in key-value database 310 based on the presence indicator 370 of key 311 that may be stored in bucket 322 assigned to key 311.

According to some embodiments, database software 342 may analyze the presence indicator 370 in bucket 322 assigned to the associated key 311 and provide the determination of the presence, e.g., a determination whether key 311 was previously uploaded and stored in key-value database 310 (e.g., the key is present) or key 311 was not previously uploaded and stored in key-value database 310 (e.g., the key is not present), to data client 360. A conflict between the presence of a key as determined based on the presence indicator 370 and the actual presence in key-value database 310 may indicate a completeness problem. According to some embodiments, for example if the CP 340 and/or database software 342 are not trusted by data client 360, data client 360 may get the bucket 322 assigned to key 311, may analyze the presence indicator 370 in bucket 322 assigned to the associated key 311 and determine the presence, e.g., determine whether key 311 was previously uploaded and stored in key-value database 310 (e.g., the key is present) or key 311 was not previously uploaded and stored in key-value database 310 (e.g., the key is not present). A conflict between the presence of a key as determined based on the presence indicator 370 and the actual presence in key-value database 310 may indicate a completeness problem.

According to some embodiments, however, CP 340 itself may not be trusted, and data client may verify the completeness of data in key-value database 310. For example, after sending the request to retrieve a value from a key-value database 310, data client 360 may obtain or receive a response from CP 340. If the response includes a value, data client 360 may verify the correctness of the returned value using the digital signature of the value (the digital signature may be obtained together with the value). However, if an empty response is obtained from CP 340, data client 360 may determine the completeness of the response based on the presence indicator 370. For example, data client 360 may obtain the bucket (e.g., bucket 322) associated with the key 311 from KeysDB 320. Obtaining bucket 322 associated with the key 311 from KeysDB 320 may include sending a request to retrieve bucket 322 from KeysDB 320, the request may include a bucket key 321 (bucket number or bucket address), where the bucket key 321 is calculated by applying the predetermined function (the same function used by DO 330 for assigning keys to buckets) on key 311. For example, the function may include a hash operation (same hash used by DO 330) that is applied on key 311, followed by a modulus operation, where the bucket key 321 may equal the result of the modulus operation. In response to the request sent by data client 360, database software 342 may provide the signed presence indicator 370 or the signed bucket 322 to data client 360, and data client 360 may determine the presence of the associated key 311 in the key-value database 310 based on the presence value in bucket 322. For example, data client 360 may search bucket 322 for the presence indicator 370 associated with key 311. If the presence indicator 370 associated with key 311 is not found in bucket 322, then data client 360 may determine that the empty response is legitimate. If, however, the presence indicator 370 associated with key 311 is found in bucket 322, then data client 360 may determine that key-value database 310 is not complete. Thus, if key 311 is not found in key-value database 310 (e.g., an empty result is provided) and the key 311 is determined to be present based on the presence indicator 370, then a completeness problem is detected in key-value database 310.

According to some embodiments, the presence indicator 370, 372, 374 may include a copy of the key. According to some embodiments, the presence indicator 370, 372, 374 may include a hashed or compressed version of the key. Thus, each bucket 322, 324, 326 may store a copy (or a hashed or compressed version of the key) of all the keys that are assigned to that bucket and present in key-value database 310. If a key-value pair is legitimately added (e.g., by DO 330) to key-value database 310, a copy of the key (or a hashed or compressed version of the key) is added to the associated bucket, and the bucket is signed again, e.g., by DO 330. If a key-value pair 311-312 is legitimately removed or deleted (e.g., by DO 330) from key-value database 310, the copy of the key is removed or deleted from the associated bucket 322, and the bucket is signed again. In case of an empty result, the relevant bucket may be searched for the requested key. If the key is found in the relevant bucket, then it may be determined that the empty result is not legitimate. If, however, key is not found in the relevant bucket, then it may be determined that the empty result is legitimate.

According to some embodiments, the presence indicator 370, 372, 374 may include a result of a Bloom filter applied to the keys assigned to a bucket. If a key-value pair 311-312 is legitimately added (e.g., by DO 330) to key-value database 310, a the Bloom filter value stored in associated bucket 322 may be updated to indicate the presence of the added key, and bucket 322 may be signed again by DO 330. It should be noted, however, that Bloom filter may function properly for append-only key-value databases, where deletes are not supported, and false-positives are allowed. There may be real world scenarios in which both conditions are accepted. Thus, append-only key-value databases in which false-positives are allowed may use Bloom Filters to improve performance and storage overhead.

Figure 4:
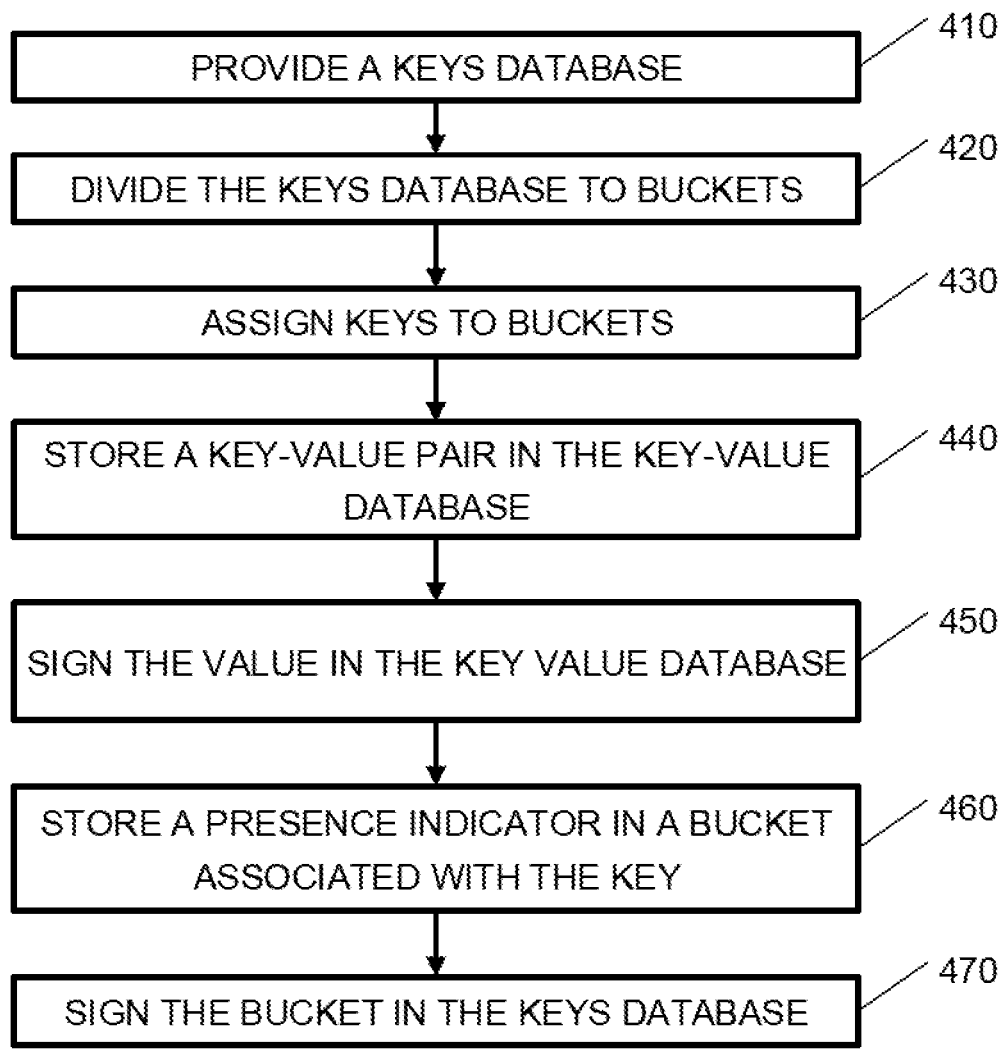
FIG. 4 is a flowchart of a method for storing a key-value pair in a key-value database, according to embodiments of the invention.

Reference is made to FIG. 4, which is a flowchart of a method for storing a key-value pair in a key-value database, according to embodiments of the invention. An embodiment of a method for storing a key-value pair in a key-value database may be performed, for example, by the systems shown in FIGS. 1, 2 and 6.

In operation 410, a keys database, KeysDB, may be provided, in addition to the key-value database. For example, keys database 320 may be provided in addition to key-value database 310. In operation 420 the keys database may be divided into a plurality of buckets or sections, each configured to store a subgroup of keys from the key-value database. When the key-value database is empty, the buckets of the KeysDB are empty as well. However, the empty buckets are signed by the DO (the signature verifies that the bucket is empty). In operation 430, each key that may be used to index data in the key-value database may be assigned or mapped to a specific bucket of the plurality of buckets. For example, a bucket may be assigned based on applying a predetermined function on the supported key. The mapping algorithm (between keys and buckets) should be known to the data clients, so that the data client will be able to find the corresponding buckets for their keys. Thus, the data client may be notified of the function and parameters used for mapping keys to buckets. The function may include, according to some embodiments of the invention, a known hash operation that is applied to the key, followed by a modulus operation, wherein the bucket number equals the result of the modulus operation. When a mapping based on a hash and modulo operations is used, the client may be notified of the mapping function, the hash function used and the value of M. Other functions may be used.

In operation 440, a key-value pair may be stored in the key-value database. For example, the key-value pair may be uploaded by the DO to the cloud, to be stored in the key-value database. In operation 450, the stored value may be signed by the DO, e.g., using RSA signature scheme, and the signature may be stored together with the value. In operation 460, a presence indicator indicative of a presence of the associated key in the key-value database may be stored in the keys database, e.g. the presence indicator indicating that a certain key was stored in the key value database by the DO (e.g. present). According to some embodiments of the invention, the presence indicator may be stored in the bucket assigned to the key (of the key-value pair). For example, the predetermined function (e.g., a hash followed by a modulus operation) may be applied on the key to find the bucket number in which the presence indicator should be stored.

The presence indicator may include a copy of the key, a hashed value of the key, any other indication that the key is present (e.g., should be present) in the key-value database. In some embodiments the presence indicator may include a result of a Bloom filter. Thus, a Bloom filter may be applied to the bucket with the key-value. In operation 470, the bucket with the presence indication may be signed by the DO, e.g., using RSA signature scheme, and the signature may be stored in the bucket.

Figure 5:
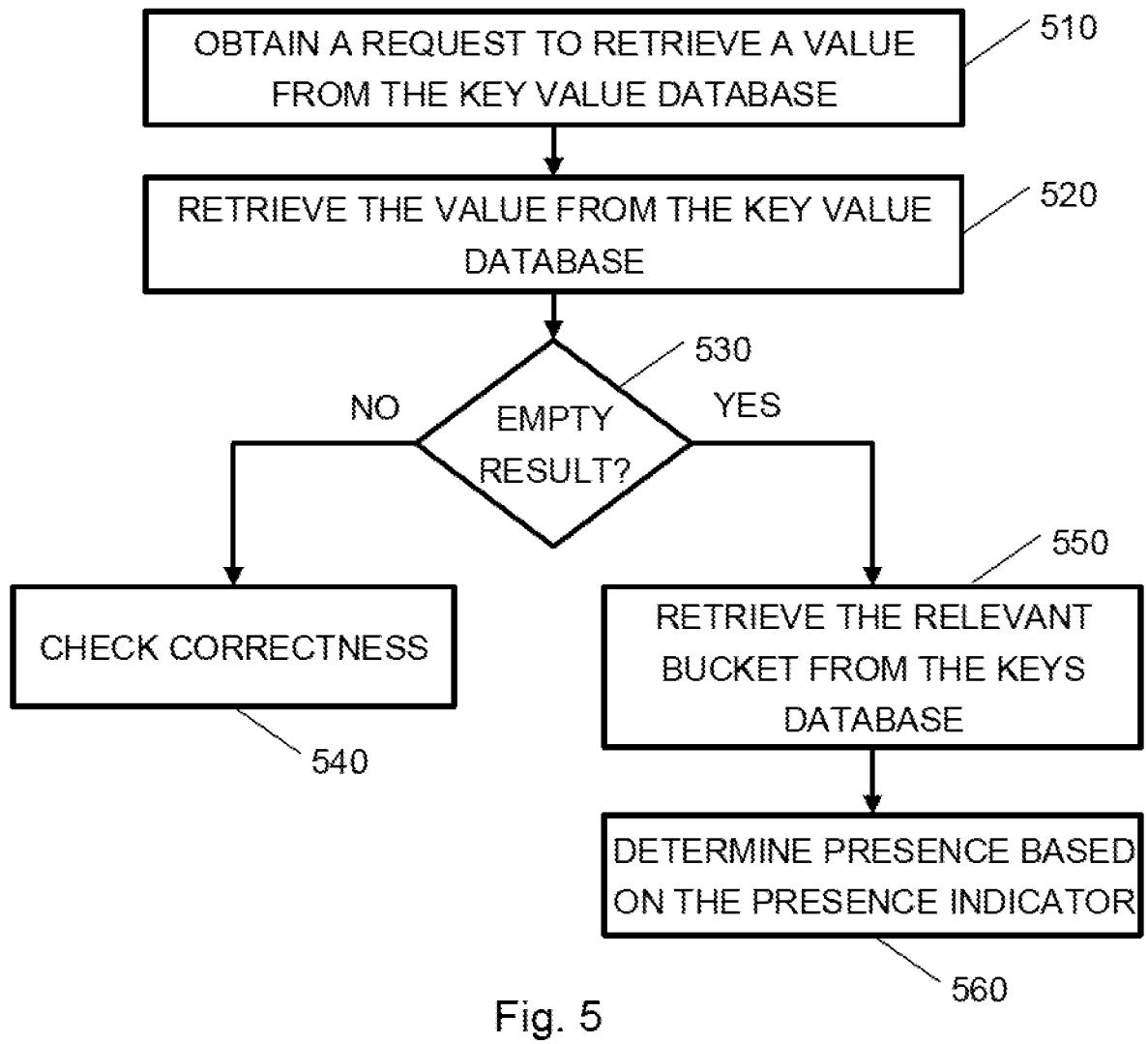
FIG. 5 is a flowchart of a method for retrieving a value from a key-value database, according to embodiments of the invention.

Reference is made to FIG. 5, which is a flowchart of a method for retrieving a value from a key-value database, according to embodiments of the invention. An embodiment of a method for retrieving a value from a key-value database may be performed, for example, by the systems shown in FIGS. 1,2 and 6.

In operation 510, a query or a request to retrieve a value from the key-value database may be obtained. The request may include the key associated with the requested value. The request may include a get(k) query. In operation 520, the value may be retrieved from the key-value database in response to the request or query. A result, R, may be provided, e.g., to the data client. For example, the CP may search for the key among the keys stored in the key-value database. If the key is found in the key-value database, the value associated with the key (and the associated signature of the value) may be retrieved from the key-value database and a result, R, including the retrieved value and the signature of the value may be provided to the data client. However, if the key is not found in the key-value database, the result, R, may be empty. In operation 530, it may be determined if the result is empty. If the result is not empty, e.g., if the result includes a value, the correctness of the value may be verified, e.g., based on the signature of the value, as indicated in operation 540. If, however, the result is empty, e.g., if the result does not include a value, the completeness of the key-value database may be verified according to embodiments of the invention using the keys database. As indicated in operation 550 the relevant bucket may be retrieved from the keys database. The relevant bucket may be determined by applying the same function used in operation 460 on the key obtained in the query. According to some embodiments, the correctness of the retrieved bucket may be verified against the signature of the bucket to ensure that the DO and no other entity has stored the bucket in the keys database. The presence of the associated key in the key-value database may be determined based on the presence indicator. If it is determined, based on the presence indicator, that the key is not present in the key-value database, then it may be determined that the DO did not store a value for that key, and no completeness problem is detected. If, however, it is determined, based on the presence indicator, that the key is present in the key-value database, then it may be determined that the DO did store a value for that key, and a completeness problem is detected.

For example, if the presence indicator is a copy of the key, the bucket may be searched for the copy of the key. If the copy is not found in the bucket, then it may be determined that the DO did not store a value for that key, and no completeness problem is detected. If, however, the copy of the key is found in the bucket, then it may be determined that the DO did store a value for that key, but the value was removed by another entity. Thus, a completeness problem may be detected. Similarly, if the presence indicator is a hashed value of the key, the bucket may be searched for the hashed value of the key, and the same logic may apply.

FIG. 6 illustrates an example computing device according to an embodiment of the invention. For example, a first computing device 700 with a first processor 705 may be used to verifying integrity of data in a computerized key-value database, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud"). For example, computing device 700 may be included in cloud computing environment 50 depicted in FIGS. 1 and 2.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for storing a key-value pair in a key-value database and for retrieving a value from the key-value database, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 730 may include or may store one or more databases including key-value database 310 and keys database 320, In some embodiments, some of the components shown in FIG. 5 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (MC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for verifying integrity of data in a computerized key-value database, the method comprising:
   receiving uploaded data from a plurality of data owners, wherein the uploaded data is stored in the computerized key-value database as key-value pairs;
   assigning, by a computer processor, each key set that is supported by the computerized key-value database to one of a plurality of buckets in a computerized key database;
   upon storing a pair of a value and an associated key set in the computerized key-value database, storing by the computer processor in a respective bucket of the plurality of buckets that is assigned to the associated key set a copy of the associated key set as signed by a respective one of the plurality of data owners that uploaded data related to the associated key set;
   detecting that a client receives an empty result when requesting the value from the computerized key-value database; and
   verifying that the empty result is complete by checking whether a key of the associated key set that corresponds to the empty result and is as signed by the respective data owner exists in the respective bucket.

2. The method of claim 1, wherein assigning the bucket to a key is performed by applying a predetermined function on the key, wherein the function includes a hash operation that is applied on the key, followed by a modulus operation, wherein the bucket key equals the result of the modulus operation.

3. The method of claim 1, wherein storing the signed copy of the key in the respective bucket comprises:
   applying a Bloom filter to the associated key and other keys that are stored in the bucket; and
   storing the result of the Bloom filter in the respective bucket.

4. The method of claim 1, comprising, upon storing a pair of a value and an associated key in the computerized key-value database, signing the value using a digital signature.

5. The method of claim 1, wherein the computerized key-value database and the computerized key database are provided as a service in a cloud computing environment.

6. The method of claim 1, wherein verifying that the empty result is complete includes validating that the signed copy of the associated key does not exist in the respective bucket.

7. The method of claim 1, further comprising:
   detecting that another client receives another empty result when requesting the value from the computerized key-value database; and
   verifying that the empty result indicates an integrity attack by verifying that the associated key was signed by the respective data owner exists in the respective bucket.

8. A system for verifying completeness of data in a computerized key-value database, the system comprising:
   a memory; and
   a processor configured to:
      receive uploaded data from a plurality of data owners, wherein the uploaded data is stored in the computerized key-value database as key-value pairs;
      assign each key that is supported by the computerized key-value database to one of a plurality of buckets in a computerized key database;
      upon storing a pair of a value and an associated key set in the computerized key-value database, storing in a respective bucket of the plurality of buckets that is assigned to the associated key set a copy of the associated key set as signed by a respective one of the plurality of data owners that uploaded data related to the associated key set;
      detect that a client receives an empty result when requesting the value from the computerized key-value database; and
      verify that the empty result is complete by checking whether a key of the associated key set that corresponds to the empty result and is as signed by the respective data owner exists in the respective bucket.

9. The system of claim 8, the processor is configured to assign the bucket to a key by applying a predetermined function on the key, wherein the function includes a hash operation that is applied on the key, followed by a modulus operation, wherein the bucket key equals the result of the modulus operation.

10. The system of claim 8, the processor is configured to sign the bucket with a digital signature.

11. The system of claim 8, wherein the processor is configured to store the signed copy of the key in the bucket by:
   applying a Bloom filter to the associated key and other keys that are stored in the bucket; and
   storing the result of the Bloom filter in the bucket.

12. The system of claim 8, wherein the processor is configured to, upon storing a pair of a value and an associated key in the computerized key-value database, sign the value using a digital signature.

13. The system of claim 8, wherein the computerized key-value database and the computerized key database are provided as a service in a cloud computing environment.

* * * * *